(12) United States Patent
Ahn et al.

(10) Patent No.: US 6,441,371 B1
(45) Date of Patent: Aug. 27, 2002

(54) SCANNING PROBE MICROSCOPE

(75) Inventors: Hyo-Sok Ahn; Choong Hyun Kim, both of Seoul (KR); Sergei A. Chizhik, Gomel (BY); Oleg Y. Komkov, Gomel (BY); Andrei M. Dubravin, Gomel (BY)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/541,623

(22) Filed: Apr. 3, 2000

(51) Int. Cl.$^7$ .............................................. G01B 21/30
(52) U.S. Cl. ......................... 250/306; 250/307; 73/105
(58) Field of Search ................................ 250/306, 307; 73/105

(56) References Cited

U.S. PATENT DOCUMENTS

| | | |
|---|---|---|
| 4,935,634 A | 6/1990 | Hansma et al. |
| 5,193,383 A | 3/1993 | Burnham et al. |
| 5,266,801 A | 11/1993 | Elings et al. |
| 5,329,808 A | 7/1994 | Elings et al. |
| 5,412,980 A | 5/1995 | Elings et al. |
| 5,418,363 A | 5/1995 | Elings et al. |
| 5,519,212 A | 5/1996 | Eilings et al. |
| 5,700,953 A | 12/1997 | Hlady et al. |
| 5,729,015 A | * 3/1998 | Tong .......................... 250/306 |

OTHER PUBLICATIONS

Y. Martin, et al, "Atomic Force Microscope–force Mapping and Profiling On A Sub 100–Å Scale," Journal of Applied Physics, vol. 61, No. 10, (May 15, 1987), pp. 4723–4729.

O. Marti, "Nanotribology: Friction On A Nanometer Scale," Physica Scripta, vol. T49, (1993), pp. 599–604.

Nancy A. Burnham, et al., "Measuring The Nanomechanical Properties And Surface Forces Of Materials Using An Atomic Force Microscope," J. Vac. Sci. Technol. A 7 (4), (Jul./Aug. 1989), pp. 2906–2913.

William A. Ducker, et al., "Rapid Measurement of Static and Dynamic Surface Forces," Appl. Phys. Lett. 56 (24), (Jun. 11, 1990), pp. 2408–2410.

L. Olsson, et al., "Interaction Forces Between A Tungsten Tip and Methylated SiO$_2$ Surfaces Studied With Scanning Force Microscopy," Ultramicroscopy, 42–44, (1992), pp. 73–79.

* cited by examiner

Primary Examiner—Kiet T. Nguyen
(74) Attorney, Agent, or Firm—Oblon, Spivak, McClelland, Maier & Neustadt, P.C.

(57) ABSTRACT

The present invention relates to a two-phase scanning method and apparatus for obtaining information necessary to analyze physical properties of materials using a scanning probe microscope. The scanning operation of the present invention is divided into two phases. First, in order to obtain information on a surface of a sample, a first scan is provided while the probe moves along the sample surface. Based upon results of the first scan, an imaginary line is defined on an average plane of the sample surface. Then, an imaginary plane, one side of which intersects the imaginary line and makes a predetermined angle with reference to the average plane, is defined over an area of interest on the sample surface. The probe is then positioned at a predetermined height on the imaginary inclined plane, and a second scan is provided during downward movement of the probe along the imaginary inclined plane.

16 Claims, 6 Drawing Sheets

SCANNING PROBE MICROSCOPE

BACKGROUND OF THE INVENTION

1. Field of the Invention

The present invention relates to a scanning probe microscope, and more particularly, to a two-phase scanning method and apparatus for obtaining information necessary to analyze physical properties of materials.

2. Background of the Invention

A scanning probe microscope (SPM) is an instrument applicable for analysis of physical properties on the surfaces of materials on a micro- and nanoscale. An SPM usually comprises a probe which has a cantilever and a tip attached to one end of the cantilever. Various modes of scanning are applicable to an SPM in accordance with the purpose of measurement. The basic modes of scanning are contact mode, non-contact mode and intermittent contact mode. The contact mode pertains to a static mode, and the non-contact mode and the intermittent contact mode are dynamic modes.

The contact mode is disclosed in U.S. Pat. No. 4,935,634 by Hansma et al. Under the contact mode, a probe tip is attached to one end of a bendable cantilever, and typically the probe tip continues to contact the surface of a sample during movement of the probe along the surface. Also, during such a movement, the vertical position of the probe relative to the surface can be controlled by a feedback so that deflection of the cantilever due to surface forces is held constant by a predetermined magnitude.

Under the non-contact mode and intermittent contact mode, a tip oscillator is attached to a XYZ translator which serves to provide positioning of the probe, and is connected with one end of the cantilever. Thus, the cantilever is oscillated at an amplitude depending on oscillation of the tip oscillator.

Typically, under the non-contact mode (developed by Martin et al., J. Applied Physics, 61(10), May 15, 1987), a cantilever with a probe tip vibrates at a small amplitude at close proximity to the surface of a sample such that the force gradient between the tip and the surface is sensed. Further, the vibration amplitude of a cantilever provides a feedback signal that allows tip-sample spacing to be held constant for profiling applications.

The intermittent contact mode (also called taping mode) is disclosed in U.S. Pat. Nos. 5,266,801 and 5,412,980 by Elings et al. Under the intermittent contact mode, a cantilever vibrates so that a probe tip contacts a sample surface in a very short interval of time. Scanning of the sample surface by the intermittent contact mode provides information on heterogeneity of micro-mechanical properties and surface force fields of the sample surface in addition to the 3-dimensional topography of the surface. Images of lateral force (O. Marti, Physica Scripta. Vol. T49, 1993), amplitude, frequency and phase shift (U.S. Pat. No. 5,519,212 by Elings et al.) can be constructed with an intermittent mode SPM.

Commercial SPM's use a plurality of modes for scanning. In general, information scanned under the contact mode can be used for mapping topographical images and friction force images of a sample surface. Information scanned under the non-contact and intermittent contact mode can be used for mapping images on the change of amplitude, frequency and phase angle of an oscillating cantilever in addition to the topographical image of a sample surface. However, most images from conventional SPM's are complicated which makes their analysis difficult, and only provide qualitative descriptions concerning micro-mechanical properties and surface force fields of a sample surface. Thus, quantitative estimation is not available from images provided by conventional SPM's.

In order to overcome this problem, force spectroscopy can be used for quantitative estimation. Static force spectroscopy is applied to obtain a function concerning the change of a cantilever deflection versus a distance between a probe tip and a sample surface (hereinafter "tip-sample distance"). In such a case, the scanning mode is set as the static mode. For static force spectroscopy, conventional, commercial SPM's are operated to position a probe at a predetermined height, vertical to any one point on a sample surface. As the probe gets closer to the sample surface from the initial vertical height, the cantilever is bent due to surface forces. During such a vertical downward movement, the change of the tip-sample distance and the change of the cantilever deflection are scanned. The cantilever deflection versus tip-sample distance curve is used for analysis on micro-mechanical properties, surface force fields (i.e. Van der Waals, electrostatic and capillary forces), elastic properties and contact adhesion of the sample (Burnham et. al., J. Vac. Sci. Technol., A7 (4), 1989; U.S. Pat. No. 5,193,383 by Burnham et al.).

However, in order to obtain the cantilever deflection versus the tip-sample distance curve according the above method, a one-dimensional scan must be conducted in a vertical direction (z-scan direction) with reference to any one point on a sample surface. In order to scan for a number of points on the sample surface, separate one-dimensional scans must be repeated along with new settings for scanning requirements at each point. Thus, considerable time is required to scan a plurality of positions on a sample surface.

Dynamic force spectroscopy is applied to acquire functions directed to the change of amplitude, frequency and phase angle of a cantilever with respect to the tip-sample distance. In such a case, scanning mode is set as the dynamic mode. The identification of these relationships is of great importance for characterization of surface force gradient, stiffness (elasticity) and viscoelasticity of materials, and also for the physical interpretation of amplitude, frequency and phase angle images which are required to map micro-mechanical properties of the surface or surface layer (Ducker et al., Appl. Phys. Lett. 56 (24), Jun. 11, 1990; Olsson et al., Ultramicroscopy, 42–44, 1992). However, conventional commercialized SPM's do not provide routine procedures for scanning dynamic parameters (e.g. amplitude, frequency or phase angle) of a cantilever relative to a tip-sample distance.

Further, in order to displace scan position of a probe from one point to another in the X-Y coordinate direction on a sample surface using a conventional SPM, a piezoelectric scanner tube (which deflects when voltages are applied to electrodes thereon to produce probe movement) is bent. In such a state, a one-dimensional vertical scan is conducted. Thus, when the scan is conducted with respect to a number of points on the sample surface, the piezoelectric scanner tube is maintained in a bent position for extended periods which make it unstable. Additionally, creep is generated in the piezoelectric scanner tube, which results in unstable and inaccurate positioning of the probe tip to an aimed point. Due to such problems, conventional SPM's cannot provide reliable results even if numerous scans are taken in a spacious area of a sample surface.

SUMMARY OF THE INVENTION

Accordingly, an object of the present invention is to overcome the above noted drawbacks and limitations of the prior art and provide an SPM and a method of operating an SPM which ensure rapid and stable scanning of a sample surface and produce reliable scan results.

To this end, the present invention provides a two-phase scanning method and apparatus. In order to obtain topographical information of a sample surface and other information such as friction force or phase angle images, the present invention initially provides a first scan at predetermined positions on the sample surface, while a probe moves along the sample surface. During the first scan, the positioning of the probe is controlled by an electronic feedback so that a deflection or amplitude of a cantilever is maintained at a predetermined setpoint. Data obtained from the first scan are stored in a memory, and an average plane of the sample surface is calculated based on the data. An imaginary line is defined on the average plane in order to specify an interested area of the sample surface in which analysis is required. An imaginary inclined plane, one side of which intersects the imaginary line and which makes a predetermined angle with reference to the average plane, is defined over the interested area. The probe is positioned at a predetermined height on the inclined plane. Then, the probe conducts a second scan at predetermined positions on the inclined plane, while it moves downward along the inclined plane until it reaches a position where deflection (in case of static mode) or amplitude (in case of dynamic mode) of the cantilever meets a predetermined setpoint. As a result of the second scan, information on deflection of the cantilever is obtained if the static mode was set as scanning mode, and information on amplitude, frequency and phase angle of the cantilever is obtained if the dynamic mode was set as scanning mode. Such information is stored in the memory. If necessary, the second scan is conducted throughout the area of interest on the sample surface. The tip-sample distances at a plurality of scan positions on the inclined plane are respectively calculated based on information provided by the first and second scans. Statistical analysis on the characteristic parameters (such as the deflection, amplitude, frequency or phase angle of the cantilever) depending on the tip-sample distance is conducted throughout the area of interest on the sample surface. Based on such analysis, a set of average parameters versus the tip-sample distance curves are obtained.

The above two-phase scanning is conducted by a scanning probe microscope of the present invention which comprises, a means for moving a probe to provide positioning of the probe with respect to a sample surface; a means for detecting change of deflection of a cantilever or change of amplitude, frequency and phase angle of the cantilever; a means for controlling the prove movement means, wherein the probe movement means is controlled based on data received from the detecting means so that deflection or amplitude of the cantilever maintains a predetermined setpoint during a first scan of the probe along the sample surface, wherein the probe is positioned at a predetermined height on an imaginary inclined plane which makes a predetermined angle with reference to an average plane of the sample surface and which is defined over the area of interest on the sample surface, and wherein the probe movement means is controlled so that a second scan is provided at a plurality of positions on the inclined plane during downward movement of the probe along the inclined plane; a means for storing data transmitted from the control means; and a means for analyzing the stored data, wherein an average plane of the sample surface is determined based on data from the first scan, and wherein the imaginary inclined plane is defined over the area of interest on the sample surface.

Other objects, features and advantages of the invention will become apparent from the following detailed description viewed in conjunction with the accompanying drawings.

BRIEF DESCRIPTION OF THE DRAWINGS

FIGS. 5(a) to 5(e) are results of a second scan directed to a diamond like carbon coating (DLC) under intermittent contact mode.

DETAILED DESCRIPTION OF THE INVENTION

Figure 1:
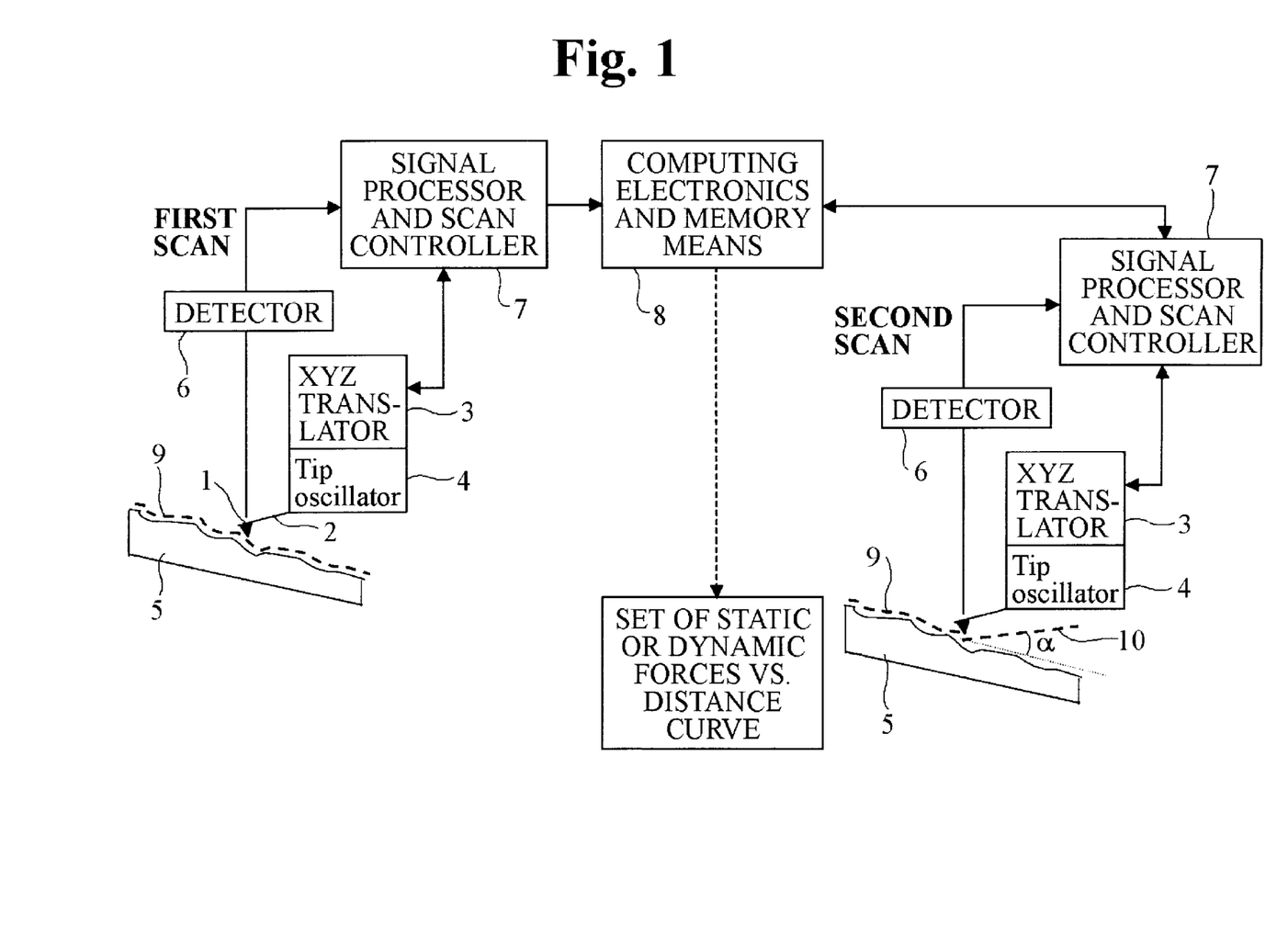
FIG. 1 is a flow chart showing the first and second scan procedures according to one embodiment of the present invention.

Referring now to the drawings, the invention will be described in greater detail. FIG. 1 shows first and second scan procedures according to one embodiment of the invention. A probe includes a cantilever 2 and a tip 1 attached to one end of cantilever 2. As shown in FIG. 1, if the probe is operated under the dynamic mode, the other end of cantilever 2 is connected with a tip oscillator 4 attached to a lower portion of an XYZ translator 3. Thus, cantilever 2 vibrates at a certain amplitude according to oscillation of tip oscillator 4. However, if the probe is operated under the static mode, cantilever 2 is attached to XYZ translator 3 from which tip oscillator 4 is removed. The term "XYZ translator" as used herein is intended to include the tip oscillator under the dynamic mode unless otherwise specifically recited. XYZ translator 3 serves to provide positioning of the probe in orthogonal X, Y and Z coordinate directions so that the probe may provide its scan with respect to a sample surface. A detector 6 is connected with cantilever 2 to detect signals directed to the deflection, amplitude, frequency and phase angle of cantilever 2. A signal processor and scan controller 7 receives signals from detector 6, and is connected with XYZ translator 3 to provide a feedback control so that XYZ translator 3 is moved in X, Y and Z coordinate directions. A computing electronics and memory means 8 serves to store and analyze data transmitted from signal processor and scan controller 7 which is connected with computing electronics and memory means 8, and again transmits the analyzed data to signal processor and scan controller 7.

The left portion of FIG. 1 shows the first scan procedure. The method of the first scan is identical to conventional scanning methods for obtaining topographical information on a sample surface. With the first scan, probe tip 1 scans at a plurality of positions, which have been set at predetermined intervals on the surface of a sample 5, while the probe moves along the sample surface with the operation of XYZ translator 3. When deflection (in case of the static mode) or amplitude (in case of the dynamic mode) of cantilever 2 changes due to influence of the sample surface profile, surface forces, etc. during the movement of the probe, the height of XYZ translator 3 with reference to the sample surface is adjusted by a feedback control based on a predetermined setpoint. The term "setpoint" refers to parameter values which should be kept constant during scan procedures. Under the static mode, deflection of the cantilever in a z-axis direction serves as a setpoint parameter. Under the dynamic mode, amplitude of the cantilever oscillation is usually chosen as a setpoint parameter. Thus, while the height of XYZ translator 3 is adjusted by a feedback control during the first scan, deflection or amplitude of cantilever 2 keeps a predetermined setpoint constant.

The first scan produces data for mapping topographical image 9 and phase angle image of the sample surface (in case of the dynamic mode) or topographical image 9 and friction force image of the sample surface (in case of the static mode). Such data are stored in computing electronics and memory means 8, and an average plane of the sample surface is calculated based on the data. In the meantime, signal processor and scan controller 7 produces a topographical image, friction force image (in case of the static mode) or phase angle image (in case of the dynamic mode) directed to the sample surface based upon the data from the first scan.

Figure 2:
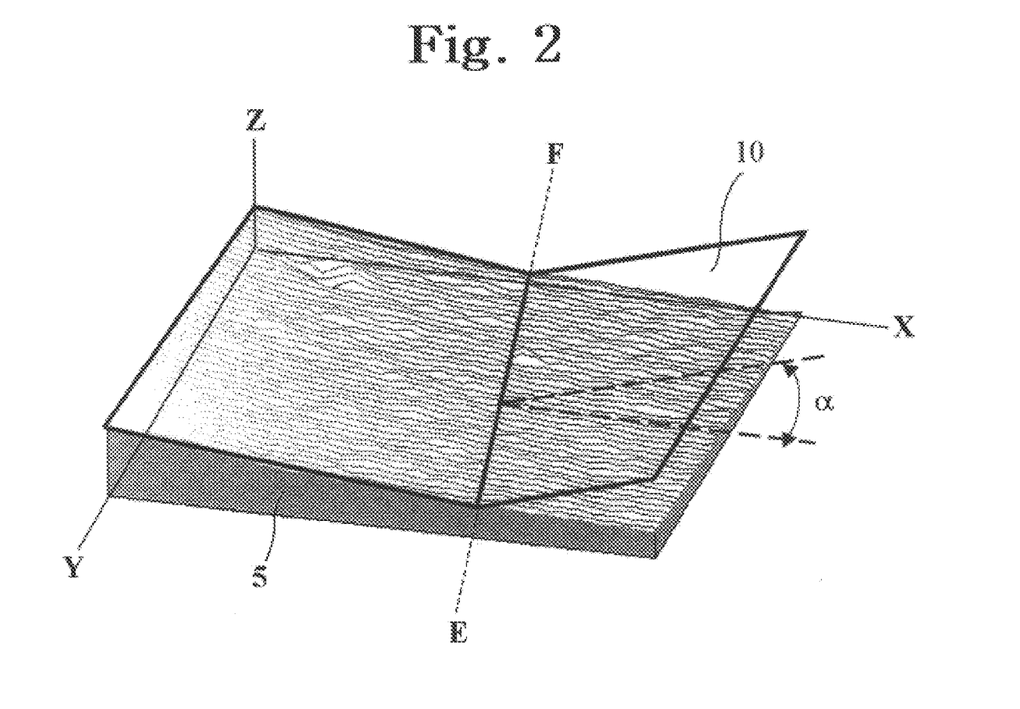
FIG. 2 illustrates an imaginary line and an imaginary inclined plane which are defined on an average plane of a sample surface.

In order to specify an area of interest on the sample surface, an imaginary line E-F is defined on the average plane of the sample surface with reference to the topographical image, friction force image or phase angle image resulting from the first scan, as shown in FIG. 2. Then, an imaginary inclined plane 10, one side of which intersects the imaginary line and which makes a predetermined angle α with reference to the average plane, is defined over the area of interest on the sample surface. Imaginary inclined plane 10 is a reference plane for control so that the probe moves downward along and from a predetermined height on the inclined plane, and is defined in computing electronics and memory means 8 shown in FIG. 1. For example, in the event that the probe moves downward along inclined plane 10 without change of its position on the y-axis, the step size $\Delta z$ in the z-axis direction is determined, as provided below, by the step size $\Delta x$ in the x-axis direction and the predetermined angle α.

$$\Delta z = x \times \tan \alpha$$

Figure 3:
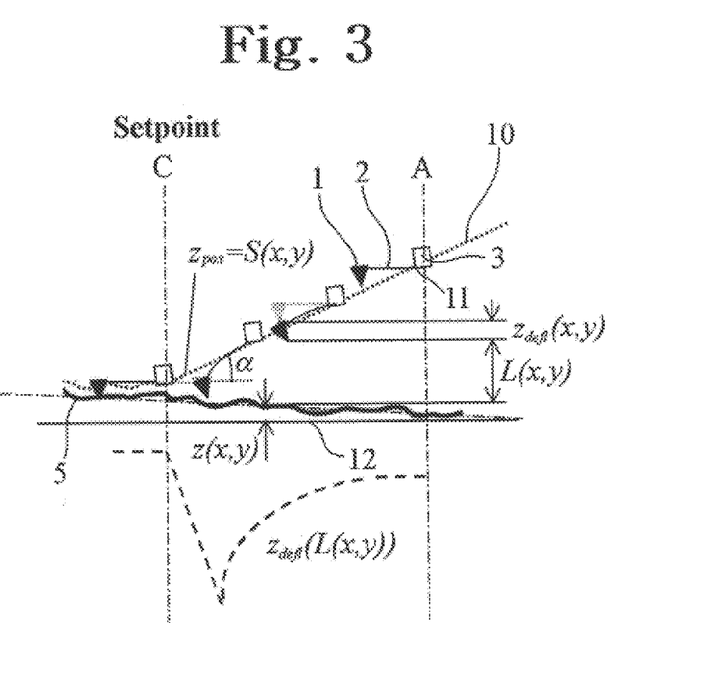
FIG. 3 shows a schematic depicting a second scan procedure in which a probe moves downward along an inclined plane without oscillation of a cantilever under static mode.

After inclined plane 10 is defined, a second scan is conducted while the probe moves downward along inclined plane 10, as shown in the right portion of FIG. 1. Upon the second scan, the probe is positioned at a predetermined height on inclined plane 10 in accordance with the operation of signal processor and controller 7 based on data from computing electronics and memory means 8. FIG. 3 shows the second scan procedure in which the probe moves along inclined plane 10 without oscillation of cantilever 2 under the static mode. In the example shown in FIG. 3, a portion 11 of the XYZ translator, to which cantilever 2 is attached, is positioned on inclined plane 10 during the movement of the probe. Under the static mode, cantilever 2 deflects toward the sample surface due to the surface forces of sample 5 during its downward movement. Upon such a downward movement, the magnitude of deflection of cantilever 2 is scanned by detector 6 at a plurality of positions which have been pre-set on inclined plane 10. Results of scanning are stored via signal processor and scan controller 7 in computing electronics and memory means 8. As shown in FIG. 3, the probe moves downward along inclined plane 10 until the deflection of cantilever 2 meets a predetermined setpoint (i.e. magnitude of pre-established deflection). When the probe arrives at a position in which the setpoint is satisfied, its movement is terminated. Alternately, when the probe arrives at the setpoint position, it may move somewhat more along the sample surface while the height of XYZ translator 3 is adjusted by a feedback control so that the deflection of cantilever 2 maintains the setpoint, as in the first scan.

When the second scan is conducted under the dynamic mode, the changes of amplitude, frequency and phase angle of cantilever 2 are scanned at predetermined positions on inclined plane 10 during downward movement of the probe along inclined plane 10 together with oscillation of the probe. In case where amplitude of the cantilever is used as a setpoint, the probe moves downward along inclined plane 10 until the amplitude of the cantilever meets the predetermined setpoint. When the probe arrives at the setpoint position, its movement is terminated. Alternately, when the probe arrives at the setpoint position, it may be moved somewhat further along the sample surface while the height of XYZ translator 3 is adjusted by a feedback control so that the amplitude of cantilever 2 maintains the setpoint, as in the first scan.

For a surface with homogeneous physical properties, the second scan is sufficient to conduct only a single line scan. However, for a heterogeneous surface it is necessary to repeat the second scan so that the entire area of inclined plane 10 is scanned to enhance reliability of scan results and to analyze physical properties in different areas of a sample.

When the second scan is completed, the tip-sample distances at a plurality of positions on inclined plane 10 are respectively calculated, as set forth below, based on data which are provided by the first and second scans and which are stored in computing electronics and memory means 8.

As shown in FIG. 3, as the probe is not affected by the surface forces at an initial position A, cantilever 2 is not deflected ($Z_{dfl}=0$). If the probe moves downward along inclined plane 10 from position A to position C which is the setpoint position, the position of tip 1 on inclined plane 10 is defined as $Z_{pos}=S(x,y)$. The magnitudes of deflection of cantilever 2, which are scanned at predetermined positions on inclined plane 10, are defined as $Z_{dfl}(x,y)$. A line indicated by a reference numeral 12 in FIG. 3 corresponds to an average plane of the sample surface. The height of the sample surface with reference to average plane 12 is defined as $Z_s=Z(x,y)$, which is stored in computing electronics and memory means 8 during the first scan. Based on the above data, the tip-sample distance, i.e. L (x,y), at each scanned position is calculated as follows:

$$L(x,y)=S(x,y)-Z_{dfl}(x,y)-Z(x,y)$$

The surface force of a sample, which is applied to tip 1, can be calculated from the function of deflection, $Z_{dfl}(x,y)$, of the cantilever versus tip-sample distance, L (x,y). In other words, the relationship between tip-sample distance L(x,y) at each scanned position (x,y) on the sample surface and force F (L) applied to tip 1 at the same position is given as follows:

$$F(L)=k \times Z_{dfl}[L(x,y)], \text{ where } k \text{ is stiffness of the cantilever.}$$

The curve of change of deflection, $Z_{dfl}(x,y)$, of the cantilever versus the tip-sample distance, L (x,y), is schematically shown in the lower portion of FIG. 3. As seen from the curve, the magnitude of deflection is increased due to attraction of the sample surface as the probe gets closer to it, and when tip 1 contacts the sample surface, the tip is rebounded in a direction opposite to the sample surface due to repulsive forces generated from the surface.

Under the dynamic mode, cantilever 2 oscillates at a certain amplitude. Thus, even if the XYZ translator 3 is stationary over any one point of a sample surface, the tip-sample distance varies according to the oscillation of cantilever 2. In consideration of this fact, the tip-sample distance is defined, as with the following equation, by the tip position on inclined plane 10 and the height of the sample surface with reference to average plane 12.

$$L(x,y)=S(x,y)-Z(x,y)$$

For reliable evaluation on the first and second scan results, statistical processing can be conducted as set forth below.

When the scanning mode of the probe is set as the static mode on a homogeneous sample surface, the magnitudes of the cantilever deflection scanned at a plurality of positions in which the tip-sample distance are identical, are collected and averaged in computing electronics and memory means 8. The average value is the magnitude of the cantilever deflection with respect to the tip-sample distance. Average values of the cantilever deflection with respect to different tip-sample distances are respectively calculated, and provide the curve of change of the average value of the cantilever deflection versus the tip-sample distance. When the scanning mode of the probe is set in the dynamic mode, magnitudes of the amplitude, frequency or phase angle of cantilever 2 scanned at a plurality of positions in which the tip-sample distance is identical, are collected and averaged in computing electronics and memory means 8. Thus, under the dynamic mode, the curve of change in the average value of the amplitude, frequency or phase angle of cantilever 2 versus the tip-sample distance, is obtained.

In a heterogeneous sample surface, the relative level of heterogeneity is identified by the difference in the gray scale of local pixels in the friction force image (in case of the static mode) or phase angle image (in case of the dynamic mode) of the sample surface. Surface positions with identical gray scale are deemed to be homogeneous, and form a homogeneous sample surface. Information on such positions is stored in computing electronics and memory means 8. When the scanning mode is set as the static mode, magnitudes of the cantilever deflection scanned at a plurality of positions, in which the tip-sample distances are identical and which are located over the surface positions defined as the homogeneous sample surface, are collected and averaged in computing electronics and memory means 8. The average value is the magnitude of the cantilever deflection with respect to the tip-sample distance. Average values of the cantilever deflection with respect to different tip-sample distances in the surface positions defined as the homogeneous sample surface are respectively calculated, thereby providing the curve of change in the average value of the cantilever deflection versus the tip-sample distance. Likewise, for sample surfaces with different micro-mechanical properties, the curve of change of the average value of the cantilever deflection versus the tip-sample distance can be respectively provided. On the other hand, when the scanning mode of the probe is set as the dynamic mode, average values of the amplitude, frequency or phase angle of the cantilever with respect to different tip-sample distances in the surface positions defined as the homogeneous sample surface are respectively calculated, thereby providing the curve of change in the average value of the cantilever deflection versus the tip-sample distance.

Figure 4A:
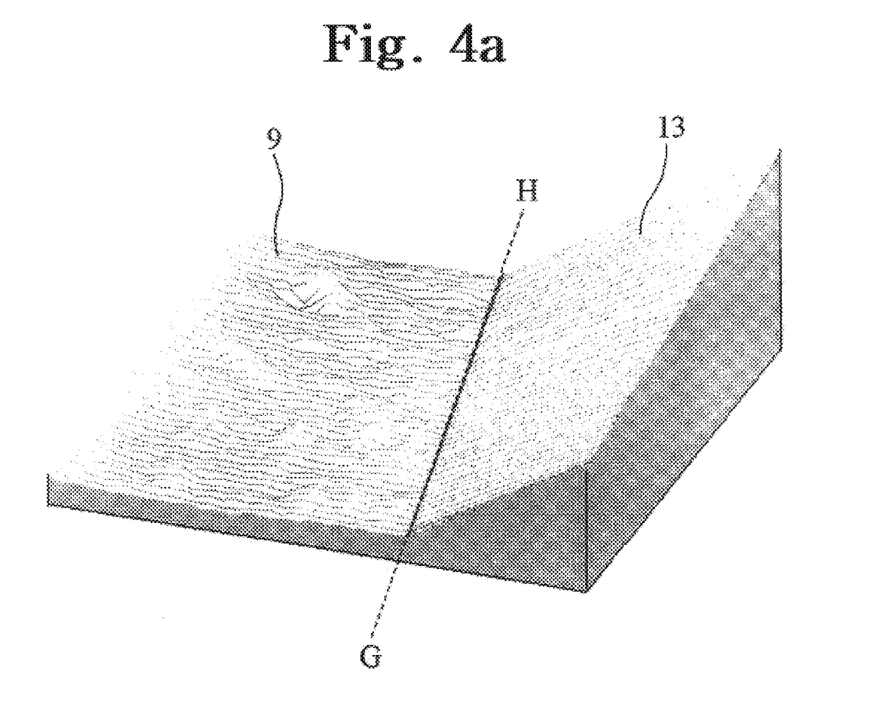
FIG. 4(a) is a topographical image resulting from a second scan.
Figure 4B:
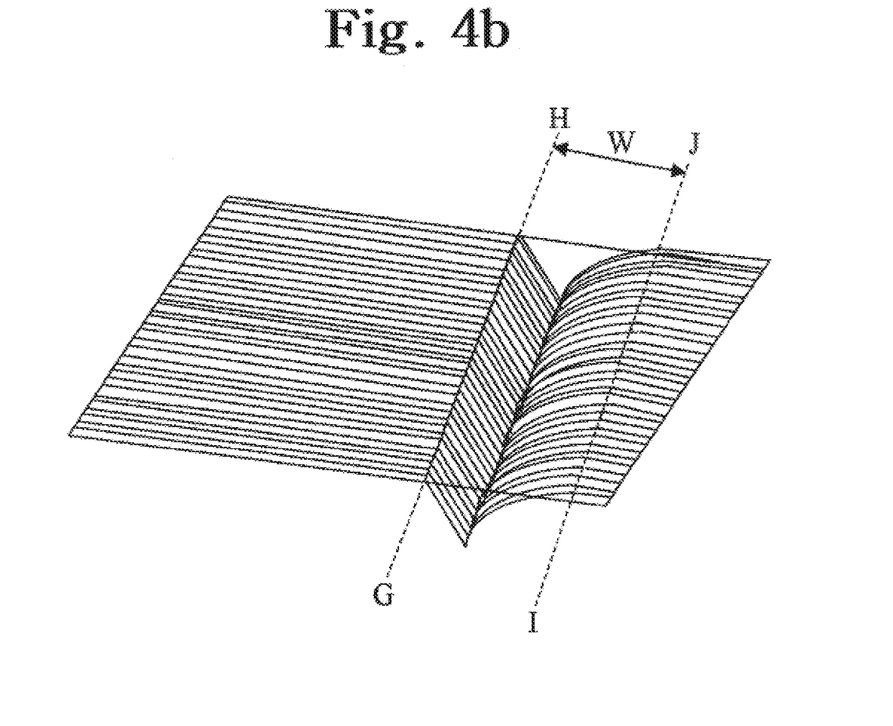
FIG. 4(b) is a 3-dimensional schematic illustration of an image from characteristic parameters such as deflection, amplitude, frequency or phase angle of a cantilever which are provided by a second scan.
Figure 5A:
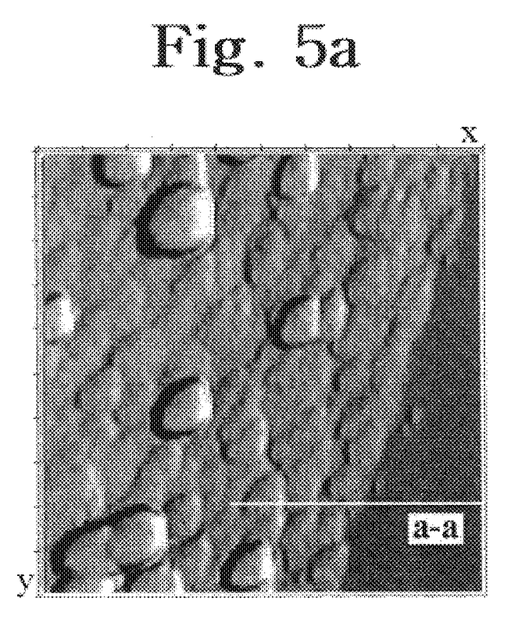
FIG. 5(a) is an electron microscope topographical image.
Figure 5B:
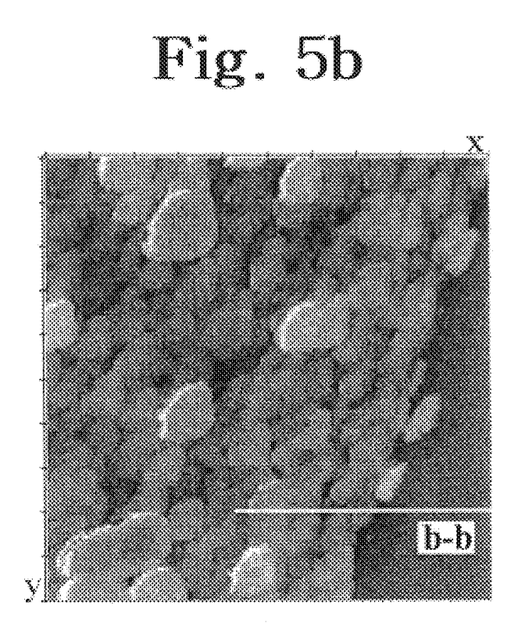
FIG. 5(b) shows a phase angle image.
Figure 5C:
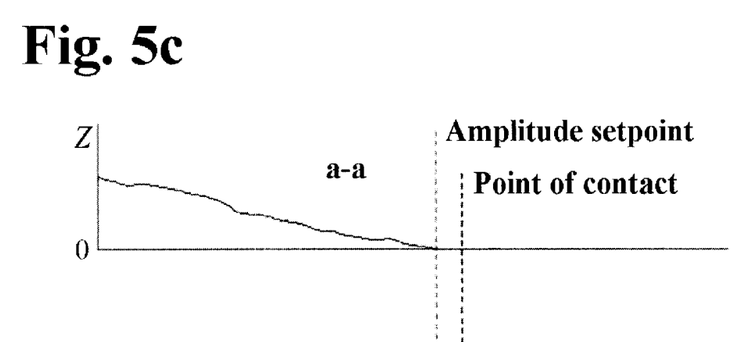
FIG. 5(c) graphically shows scan results of topography taken along line a—a in FIG. 5(a)
Figure 5D:
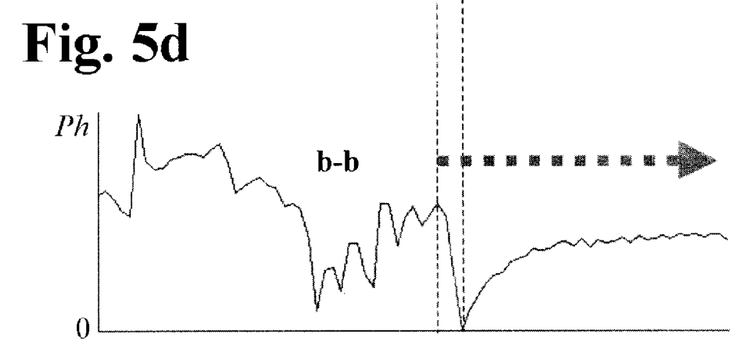
FIG. 5(d) shows the change of phase angle taken along line b—b in FIG. 5(b)
Figure 5E:
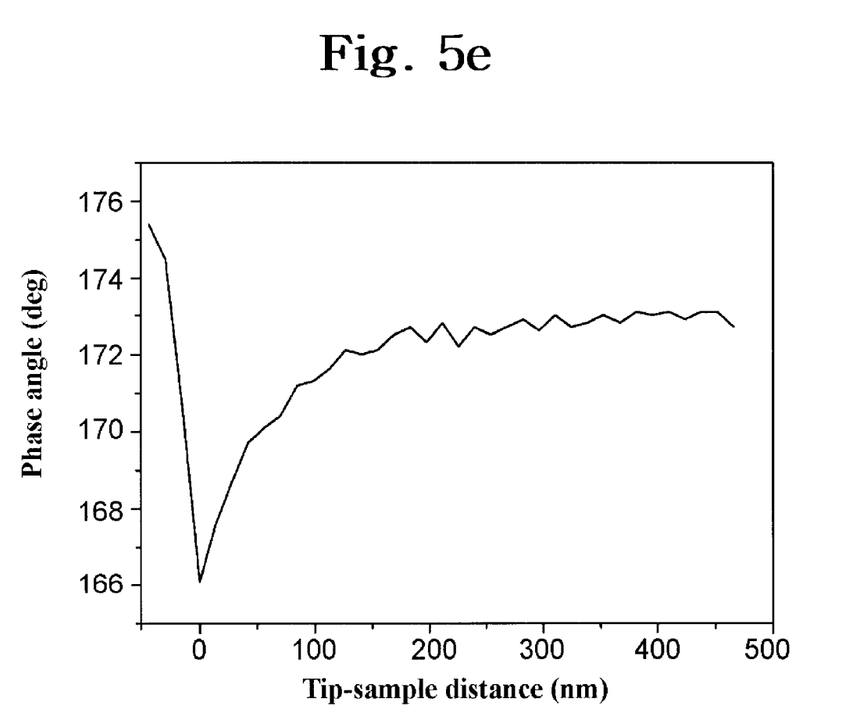
FIG. 5(e) shows the phase angle versus tip-sample distance curve taken along line b—b in FIG. 5(b).

FIGS. 4(*a*) and 4(*b*) show results of the second scan. FIG. 4(*a*) is a topographical image, and in particular, area 9 left of setpoint line G-H is the topographical image of the sample surface. Image area 9 is identical to the topographical image provided by the first scan. The area right of setpoint line G-H is topographical image 13 which represents the trace of tip 1 during downward movement of the probe along the inclined plane.

FIG. 4(*b*) is a schematic illustration which shows the image of characteristic parameters such as deflection, amplitude, frequency or phase angle of cantilever 2 which are stored in computing electronics and memory means 8 during the second scan. "W" in FIG. 4(*b*) refers to band width. The changes of deflection, amplitude, frequency or phase angle of cantilever 2 are generated due to surface forces in the area within the band width W (i.e. the area confined to G-H and I-J), during the downward movement of the probe along inclined plane 10. The area within the band width W is subject to analysis on its physical properties.

FIGS. 5(*a*) to 5(*e*) show results of the second scan under the intermittent contact mode. Diamond like carbon coating (DLC) was used as a sample. FIGS. 5(*a*) and 5(*b*) represent a topographical image and a phase angle image, respectively. Setpoint parameter was set as oscillation amplitude of 10 nm, where free amplitude of the cantilever oscillation is 20 nm. The angle between an imaginary inclined plane and the average plane of a sample surface was 10°. The non-pattern portion in the right lower corners of FIGS. 5(*a*) and 5(*b*) represent images for the inclined plane, and the pattern portion in the left in FIGS. 5(*a*) and 5(*b*) represent images for the sample surface. Non-linearity of the boundary between the inclined plane and the sample surface is due to surface roughness and physical heterogeneity of the sample. FIG. 5(*c*) shows topography taken along line a—a in FIG. 5(*a*), that is, a scan result of profile in a z-axis direction. In FIG. 5(*c*), a horizontal line on the right side of the amplitude setpoint corresponds to the imaginary inclined plane, and the z-axis direction profile in the left side of the amplitude setpoint is sloped upward about 10° with reference to the inclined plane. FIG. 5(*d*) shows the change of phase angle taken along line b—b of FIG. 5(*b*), where the arrow indicates an area of interest on the sample surface. The point of contact described in FIGS. 5(*c*) and 5(*d*) refers to a point at which the probe tip first contacts the sample surface during movement of the probe along the inclined plane. FIG. 5(*e*) shows the curve of change in phase angle versus tip-sample surface which is taken along line b—b in FIG. 5(*b*). The bandwidth in this curve is about 250 nm. As understood from FIG. 5(*e*), the change of phase angle according to the influence of surface forces is increased as the tip-sample distance is decreased. In addition, as shown in FIGS. 5(*a*) –5(*e*), the sample surface is non-uniform and statistical processing of scan results would have been required.

The present invention overcomes the problems in conventional techniques and provides many advantages with the above-described construction and constitution. While a probe moves downward along an imaginary inclined plane which is defined over the area of interest on a sample surface, it scans at a plurality of positions. Thus, scanning a spacious area of sample surface can be conducted within a short period of time, which results in considerable savings in man hours and costs. As the present invention provides the second scan while moving a XYZ Translator along an inclined plane, bending of the XYZ translator is not needed to displace the position of a tip from one point to the another in the X-Y coordinate direction. Thus, stable and reliable scan results are obtained. In addition, because the present invention provides statistical analysis on the results of the second scan, reliable results can be provided even for heterogeneous sample surfaces. Further, the present invention not only provides the curve of change of cantilever deflection versus the tip-sample distance, but also provides the curve of change of amplitude, frequency or phase angle of a cantilever versus the tip-sample distance when scanning mode is set as the dynamic mode. Thus, a large variety of data for analysis of physical properties of a sample surface can be obtained according to the present invention.

The foregoing was presented by way of example to describe the present invention and its operation, and is not intended to limit the scope of its coverage. One skilled in the art will be able to adapt various modifications after having the benefit of this disclosure. All such modifications and variations are intended to be within the scope and spirit of the presently claimed invention which is as follows.

What is claimed is:

1. In a method for obtaining information necessary to analyze physical properties of a sample surface using a scanning probe microscope which has a probe having a cantilever and a tip attached to one end of the cantilever, said method comprising the steps of:

providing a first scan at a plurality of positions, which have been pre-set at predetermined intervals on the sample surface, during movement of the probe along the sample surface in order to acquire information on the sample surface while deflection or amplitude of the cantilever maintains a predetermined setpoint by a feedback control;

determining an average plane of the sample surface based on data provided by the first scan and defining an imaginary line on the average plane in order to specify an area of interest on the sample surface;

defining an imaginary inclined plane, one side of which intersects the imaginary line and which makes a predetermined angle with reference to the average plane, over the interested area; and positioning the probe at a predetermined height on the inclined plane and providing a second scan at a plurality of positions, which have been pre-set at predetermined intervals on the inclined plane, while the probe moves downward along the inclined plane to approach the sample surface until the deflection or amplitude of the cantilever meets the predetermined setpoint.

2. The method according to claim 1 wherein the magnitude of deflection of the cantilever is scanned at each position on the inclined plane when the scanning mode is set as static mode in the step of providing the second scan, and wherein the magnitudes of amplitude, frequency and phase angle of the cantilever are scanned at each position on the inclined plane when the scanning mode is set as dynamic mode in the step of providing the second scan.

3. The method according to claim 1 further comprising the step of repeating the second scan so that an overall area on the inclined plane is scanned.

4. The method according to any one of claims 1 to 3 wherein distances between the tip and the sample at the plurality of positions on the inclined plane are respectively calculated based upon data provided by the first and second scans.

5. The method according to claim 4 wherein the tip-sample distance is a distance between a tip position on the inclined plane and the sample surface when scanning mode is set as dynamic mode.

6. The method according to claim 5 further comprising collecting magnitudes of amplitude, frequency or phase angle of the cantilever scanned at a plurality of positions in which the tip-sample distance is identical when the scanning mode is set as static mode, obtaining an average value of the collected magnitudes, and defining the average value as the magnitude of the cantilever deflection with respect to said tip-sample distance.

7. The method according to claim 6 further comprising the step of providing curves of change of amplitude, frequency or phase angle of the cantilever versus the tip-sample distance for homogeneous sample surfaces.

8. The method according to claim 5 further comprising determining surface positions defined as a homogeneous sample surface based on phase angle image provided by the first scan when the scanning mode is set as dynamic mode; and the step of collecting magnitudes of amplitude, frequency or phase angle of the cantilever scanned at a plurality of positions in which a tip-sample distance is identical and which are located over the surface positions defined as the homogeneous sample surface obtaining an average value of the collected magnitudes, and defining the average value as the magnitude of the cantilever deflection with respect to said tip-sample distance.

9. The method according to claim 8 further comprising the step of providing curves of change of amplitude, frequency or phase angle of the cantilever versus the tip-sample distance for homogeneous sample surfaces.

10. The method according to claim 4 further comprising collecting magnitudes of the cantilever deflection scanned at a plurality of positions in which the tip-sample distance is identical when scanning mode is set as static mode, obtaining an average value of the collected magnitudes, and defining the average value as the magnitude of the cantilever deflection with respect to said tip-sample distance.

11. The method according to claim 10 further comprising the step of providing curves of change of the cantilever deflection versus the tip-sample distance for homogeneous sample surfaces.

12. The method according to claim 4 further comprising determining surface positions defined as a homogeneous sample surface based on a friction force image provided by the first scan when the scanning mode is set as static mode; and the step of collecting magnitudes of the cantilever deflection scanned at a plurality of positions in which the tip-sample distance is identical and which are located over the surface positions defined as the homogeneous sample surface, obtaining an average value of the collected magnitudes, and defining the average value as the magnitude of the cantilever deflection with respect to said tip-sample distance.

13. The method according to claim 12 further comprising the step of providing curves of change of the cantilever deflection versus the tip-sample distance for homogeneous sample surfaces.

14. In a scanning probe microscope including a probe having a cantilever and a tip attached to one end of the cantilever, said scanning probe microscope comprising:

a probe movement means for moving a probe to provide positioning of the probe with respect to a sample surface;

means for detecting change of deflection of a cantilever or change of amplitude, frequency and phase angle of the cantilever;

means for controlling the probe movement means, wherein the probe movement means is controlled based on data received from the detecting means so that deflection or amplitude of the cantilever maintains a predetermined setpoint during a first scan of the probe along the sample surface, wherein the probe is positioned at a predetermined height on an imaginary inclined plane which makes a predetermined angle with reference to an average plane of the sample surface and which is defined over an area of interest on the sample surface, and wherein the probe movement means is controlled so that a second scan is provided at a plurality of positions on the inclined plane during downward movement of the probe along the inclined plane;

means for storing data transmitted from the control means; and means for analyzing the stored data, wherein the average plane of the sample surface is determined based on data from the first scan, and wherein the imaginary inclined plane is defined over the area of interest on the sample surface.

15. The scanning probe microscope according to claim 14 wherein the probe movement means is controlled to move downward along the inclined plane until the probe reaches a position in which deflection or amplitude of the cantilever meets a predetermined setpoint.

16. The scanning probe microscope according to claim 14 or 15 wherein the probe movement means is controlled so that the second scan is provided throughout the inclined plane over the area of interest.

* * * * *